US007937382B2

(12) United States Patent
Soldan et al.

(10) Patent No.: US 7,937,382 B2
(45) Date of Patent: May 3, 2011

(54) TRIGGERS FOR TIME-SHIFTED CONTENT PLAYBACK

(75) Inventors: Eric R. Soldan, Saratoga, CA (US); Bradley R. Pettit, Los Gatos, CA (US); Nicolae Surpatanu, San Jose, CA (US); James A. Baldwin, Redwood City, CA (US)

(73) Assignee: Microsoft Corporation, Redmond, WA (US)

( * ) Notice: Subject to any disclaimer, the term of this patent is extended or adjusted under 35 U.S.C. 154(b) by 397 days.

(21) Appl. No.: 12/141,922

(22) Filed: Jun. 19, 2008

(65) Prior Publication Data

US 2009/0319470 A1 Dec. 24, 2009

(51) Int. Cl.
*G06F 17/30* (2006.01)
*G06F 17/00* (2006.01)

(52) U.S. Cl. ........ 707/705; 715/718; 715/738; 725/112; 725/109; 725/110

(58) Field of Classification Search ........... 707/999.107; 715/718, 738; 725/112, 109, 110, 93
See application file for complete search history.

(56) References Cited

U.S. PATENT DOCUMENTS 6,326,982 B1 * 12/2001 Wu et al. ...................... 715/718
7,269,842 B1 9/2007 Estipona
7,310,751 B2 12/2007 Tayler et al.
7,437,751 B2 * 10/2008 Daniels ........................ 725/112
7,779,445 B2 * 8/2010 Ellis ............................... 725/93
2002/0056129 A1 5/2002 Blackketter et al.
2002/0188628 A1 12/2002 Cooper et al.
2005/0166257 A1 7/2005 Feinleib et al.
2006/0031914 A1 2/2006 Dakss et al.
2006/0136979 A1 6/2006 Staker et al.
2007/0079353 A1 4/2007 Boortz
2007/0217761 A1 9/2007 Chen et al.

OTHER PUBLICATIONS

"ImageLoader Utility", retrieved at << http://developer.yahoo.com/yui/imageloader/ >>, Yahoo, Inc, 2008, pp. 4.

Winkler, et al., "Monitoring Navigation Using Time-Lapse Video Recorders", Dec. 2003, pp. 1-8.

* cited by examiner

*Primary Examiner* — Yicun Wu

(57) ABSTRACT

In accordance with one or more aspects, a trigger corresponding to media content is retrieved from a storage device. The trigger includes a time-shift parameter identifying how much playback of the media content can be time-shifted while keeping the trigger valid. A determination is made, based at least in part on a current time and the time-shift parameter, whether the trigger is valid during playback of the media content.

17 Claims, 6 Drawing Sheets

200

TRIGGERS FOR TIME-SHIFTED CONTENT PLAYBACK

BACKGROUND

Time-shifted viewing of television programs has been permitted by various technologies, including video cassette recorders (VCRs) and more recently digital versatile disc (DVD) recorders and digital video recorders (DVRs). Although time-shifted viewing of programs can provide many advantages to users, problems can also arise when playing back time-shifted programs. For example, some programs may allow for user input, such as voting for particular contestants. Problems can arise if the user has recorded the program and is playing back the program time-shifted because it may no longer make sense for the user to provide his or her input.

SUMMARY

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

In accordance with one or more aspects of the triggers for time-shifted content playback, a consumer device stores a trigger corresponding to media content on a storage device. The trigger is retrieved from the storage device and a check is made, while playing back the media content, whether one or more criteria of the trigger are satisfied, the one or more criteria including a time-shift parameter identifying how long the trigger is valid after the media content has been aired. One or more actions identified by the trigger are performed if the criteria of the trigger are satisfied, and the one or more actions are not performed if the criteria of the trigger are not satisfied.

In accordance with one or more aspects of the triggers for time-shifted content playback a trigger corresponding to media content is retrieved from a storage device. The trigger includes a time-shift parameter identifying how much playback of the media content can be time-shifted while keeping the trigger valid. A determination is made, based at least in part on a current time and the time-shift parameter, whether the trigger is valid during playback of the media content.

In accordance with one or more aspects of the triggers for time-shifted content playback a consumer device includes a trigger store and a monitor module. The trigger store is to store multiple triggers, each of the multiple triggers comprising a criteria portion and a payload portion, the criteria portion identifying one or more criteria and the payload portion identifying one or more actions to be performed. The one or more criteria include a time-shift parameter. The monitor module is to monitor data corresponding to media content being played back and detect when the data satisfies the one or more criteria of one or more of the multiple triggers.

BRIEF DESCRIPTION OF THE DRAWINGS

The same numbers are used throughout the drawings to reference like features.

DETAILED DESCRIPTION

Triggers for time-shifted content playback are discussed herein. Media content played back by consumer devices for time-shifted viewing can have one or more corresponding triggers. Each trigger has a criteria portion and a payload portion. The payload portion identifies one or more actions to be performed when the criteria or parameters in the criteria portion are satisfied. One of these parameters in the criteria portion is a time-shift parameter identifying how long the trigger is valid after the media content is first available. The consumer device checks, while playing back the media content, whether the trigger is still valid. If too much time has elapsed since distribution of the media content, as indicated by the time-shift parameter, then the trigger is no longer valid. If valid, the one or more actions identified in the payload portion of the trigger are performed; otherwise, the one or more actions identified in the payload portion of the trigger are not performed.

Figure 1:
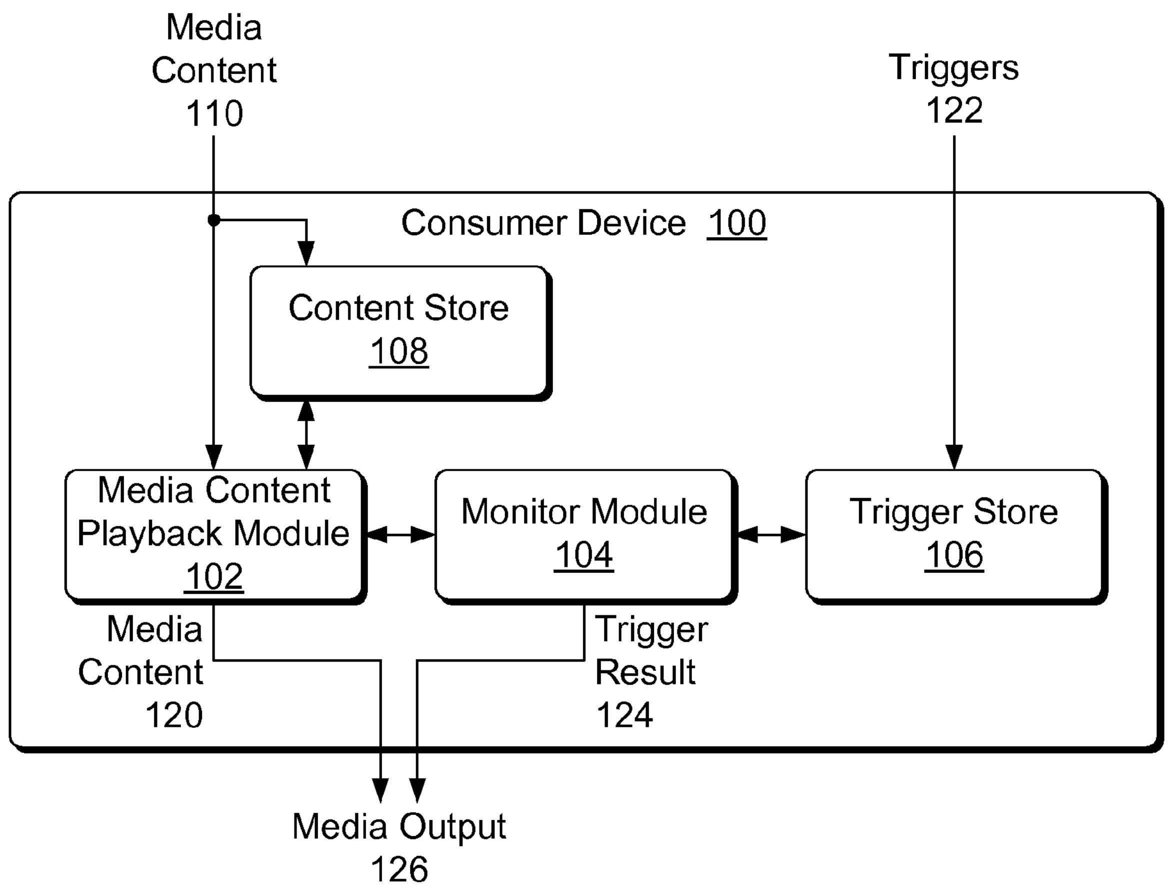
FIG. 1 illustrates an example consumer device implementing the triggers for time-shifted content playback in accordance with one or more embodiments.

FIG. 1 illustrates an example consumer device 100 implementing the triggers for time-shifted content playback in accordance with one or more embodiments. Consumer device 100 can be any of a variety of devices that output video for display. For example, consumer device 100 can be a computer, such as a desktop computer, server computer, a mobile station, an entertainment appliance, a set-top box communicatively coupled to a display device, a video playback device (e.g., digital video recorder (DVR), digital versatile disk (DVD) player and/or recorder, etc.), a television, a cell or other wireless phone, a game console, an automotive PC, and so forth. Thus, consumer device 100 can range from full resource devices with substantial memory and processor resources (e.g., personal computers, game consoles, etc.) to a low-resource device with limited memory and/or processing resources (e.g., traditional set-top boxes, hand-held game consoles, DVD players, etc.).

Consumer device 100 includes a media content playback module 102, a monitor module 104, a trigger store 106, and a content store 108. Media content refers to one or more of a variety of different types of content that can be played back to a user. Oftentimes media content is audio/video content (e.g., particular programs such as movies, sitcoms, commercials, news broadcasts, documentaries, sporting events, and so forth). The media content can thus be referred to as being or including a particular program. Alternatively, media content can be only one type of content (e.g., just audio content, just video content, etc.), or can be other types of content (e.g., images, text, and so forth).

Media content playback module 102 receives media content 110 and outputs media content 120. Media content 110 can be received directly by playback module 102 or alternatively can be received via content store 108. Content store 108 allows for time-shifted viewing of media content, providing storage for media content 110. Although illustrated as part of consumer device 100, it is to be appreciated that content store 108 can be implemented on one or more removable media (e.g., magnetic disk, optical disc, flash memory, etc.) and/or one or more remote storage devices (e.g., a server computer, another consumer device, etc.).

Time-shifted viewing of media content can also be accomplished in other manners. For example, media content 110 can be a Video-On-Demand program. Viewing of the program can be time-shifted due to the ability of the user to select a time for viewing of the program (after the program is first available). Time-shifted viewing of media content can refer to a variety of different situations where there is an expected time of viewing (e.g., a time when the program is aired, a time when the program is first available, etc.), and the actual viewing time by the user is different.

Media content playback module 102 converts media content 110 into a format that can be played back (e.g., displayed by a display device, played back by speakers, etc.) and outputs the converted media content as media content 120. Media content playback module 102 can also receive input from a user (e.g., via a remote control device) or other component or module of device 100 to control the output of media content 120, such as to pause playback of the content, select particular media content for playback, fast forward or rewind through the media content, and so forth.

Media content 120, along with trigger result 124 as discussed in more detail below, are output by consumer device 100 as media output 126. In one or more embodiments, consumer device 100 plays back media output 126 (e.g., displays video content, plays back audio content, and so forth). In other embodiments consumer device 100 generates one or more signals based on media content 110 and/or trigger result 124 that is output to one or more other devices (e.g., televisions, projectors, speakers, etc.) which in turn display or otherwise present media output 126.

Media content 110 can be distributed to consumer device 100 in a variety of different manners. The sources of media content 110 can be local sources, such as a hard disk or a DVD that is inserted into, coupled to, or included as part of consumer device 100. The sources of media content 110 can also be remote sources, such as one or more remote servers, satellite operators, network television operators, cable operators, or other devices or operators making content 110 available to consumer device 100. Remote sources can make content 110 available over a variety of different types of transmission media, such as one or more of satellite transmissions, radio frequency transmissions, cable transmissions, the Internet, a wide area network (WAN), a local area network (LAN), a wireless network, a telephone network, an intranet, and so forth.

In one or more embodiments, media content 110 is aired over one or more transmission media and received by consumer device 100. The airing of media content refers to the transmitting of the program by the source via a transmission media. The aired media content 110 can be stored in content store 108 for time-shifted playback. Alternatively, media content 110 can be played back as it is received without being stored in content store 108. In other embodiments, media content 110 can be distributed using other techniques, such as optical discs, flash memory, and so forth.

Trigger store 106 receives and stores triggers 122. Each trigger 122 includes a payload portion identifying one or more actions to be performed, and a criteria portion identifying one or more criteria that are to be satisfied in order for the one or more actions to be performed. Although illustrated as separate from content store 108, alternatively trigger store 106 and content store 108 can be implemented as a single store. Additionally, although illustrated as part of consumer device 100, it is to be appreciated that trigger store 106 can be implemented on one or more removable media (e.g., magnetic disk, optical disc, flash memory, etc.) and/or one or more remote storage devices (e.g., a server computer, another consumer device, etc.).

Triggers 122 can be distributed to consumer device 100 in a variety of different manners. Analogous to media content 110, triggers 122 can be received from local sources or remote sources distributing triggers 122 over a variety of different transmission media or using other distribution techniques. By way of example, triggers 122 can be received with media content 110 (e.g., embedded therein, as part of a separate stream, in metadata of media content 110, etc.), can be received with programming guide data, can be received via a separate communication with a trigger source, and so forth.

Figure 2:
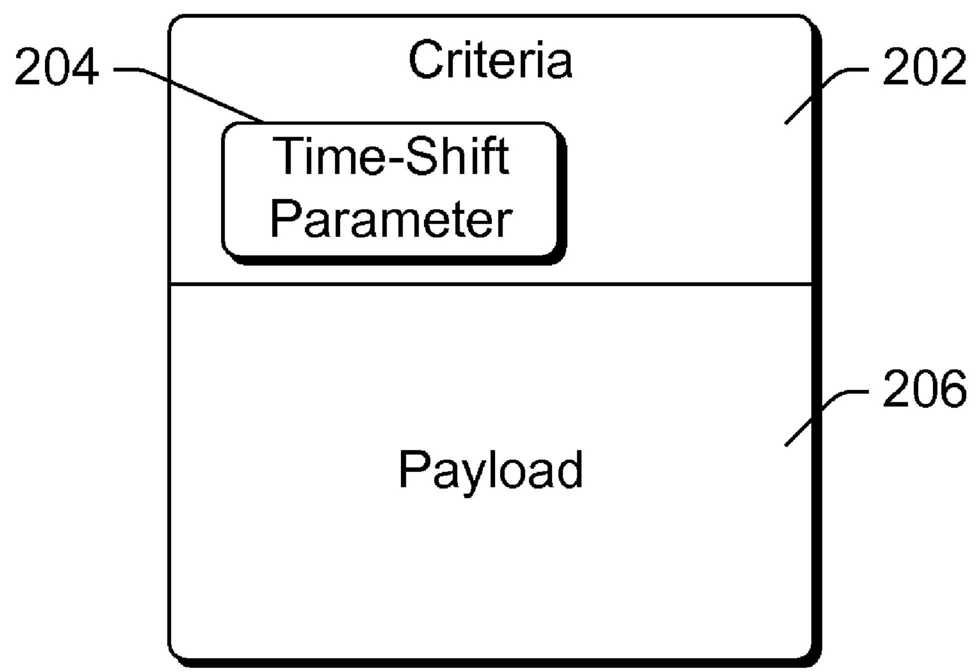
FIG. 2 illustrates an example trigger that can be used with the triggers for time-shifted content playback in accordance with one or more embodiments.

FIG. 2 illustrates an example trigger 200 that can be used with the triggers for time-shifted content playback in accordance with one or more embodiments. Trigger 200 includes a criteria portion 202 including a time-shift parameter 204, and a payload portion 206. In one or more embodiments, trigger 200 also includes a trigger identifier, although in other embodiments no such identifier is included.

Payload portion 206 identifies one or more actions to be performed. A variety of different actions can be included in payload portion 206. These actions can include displaying or otherwise presenting advertisements or other information, running a particular application or program, loading and displaying a Web page, creating a new trigger, performing one or more actions identified in the payload portions of one or more other triggers, and so forth. Applications or programs identified in payload portion 206 as to be run can be included in trigger 200 (e.g., in payload portion 206), can have been previously downloaded to the consumer device on which trigger 200 is being used, can be downloaded or run from a Web page identified in payload portion 206, and so forth.

Additionally, the one or more actions identified in payload portion 206 can include data, a script or other instructions, or other information to be made available to an application when the criteria in criteria portion 202 is satisfied. This application can be monitor module 104 of FIG. 1, or alternatively another module or application. This application can be an already executing application, or alternatively an application that is executed in response to the criteria in criteria portion 202 being satisfied.

Different triggers 200 can identify different actions to be performed, with the author or creator of a particular trigger being able to include the particular one or more actions that they desire in payload portion 206. For example, payload portion 206 can identify one or more actions to run a feedback application that displays, on the consumer device, a user interface allowing the user to input feedback regarding the media content corresponding to trigger 200. By way of another example, payload portion 206 can identify one or more actions to run a voting application that displays, on the consumer device, a user interface allowing the user to vote for a particular contestant in the media content corresponding to trigger 200.

Criteria portion 202 identifies one or more parameters or criteria that are to be satisfied in order for the one or more actions in payload portion 206 to be performed. At least one of these one or more criteria is a time-shift parameter 204. Although only one time-shift parameter 204 is illustrated in FIG. 2, in alternate embodiments multiple time-shift parameters 204 can be included in criteria portion 202 (e.g., different time-shift parameters 204 can be associated with different actions in payload portion 206).

Time-shift parameter 204 identifies how much playback of the media content corresponding to trigger 200 can be time-shifted while keeping the trigger valid. If trigger 200 is valid, criteria portion 202 would be satisfied (assuming any other criteria in portion 202 is satisfied) and the one or more actions in payload portion 206 would be performed as discussed in more detail below. If trigger 200 is invalid, criteria portion 202 would not be satisfied and the one or more actions in payload portion 206 would not be performed as discussed in more detail below.

In one or more embodiments, time-shift parameter 204 identifies an explicit date and/or time at which trigger 200 becomes invalid. For example, time-shift parameter 204 can identify that trigger 200 becomes invalid at 11:00 pm (local time or in a particular time zone) on Apr. 15, 2008. In one or more other embodiments, time-shift parameter 204 is a relative value identifying an amount of time after the media content corresponding to trigger 200 has aired or has otherwise been distributed. For example, the media content can have a corresponding indication of when the media content was first available (e.g., first aired, first available for download, first available for playback, etc.), and time-shift parameter 204 can be relative to this "first available" time. Once this amount of time has elapsed trigger 200 becomes invalid. For example, time-shift parameter 204 can identify that trigger 200 becomes invalid three hours after the program corresponding to trigger 200 is first available (e.g., three hours from the beginning of airing of the media content, three hours from the ending of airing of the media content, three hours after a Video-On-Demand program is first available, and so forth).

It should be noted that a trigger can be valid even though it may initially appear that the time-shift parameter will not be satisfied. For example, assume that time-shift parameter 204 identifies that trigger 200 becomes invalid three hours from the ending of airing of a program. If a user begins playback of the program four hours after the beginning of airing of the program, then it may appear that time-shift parameter 204 would not be satisfied. However, if the user fast forwards or skips over part of the program, then it is possible that by the time the user is watching the end of the program the time is still within three hours from the ending of airing of the program, and the time-shift parameter 204 would be satisfied.

In one or more embodiments, time-shift parameter 204 can have a particular value indicating that there are no restrictions on how much playback of the media content corresponding to trigger 200 can be time-shifted. In other words, this particular value indicates that any amount of time-shifting is permissible. Alternatively, some triggers 200 may not include the time-shift parameter 204, with the absence of time-shift parameter 204 indicating that any amount of time-shifting is permissible.

Additionally, various other criteria can also be included in criteria portion 202. In one or more embodiments, this criteria includes an identifier of particular media content. This identifier can be, for example, a title or name of the particular media content, a summary or other description of the content, or some other identifier. When such criteria are included in criteria portion 202, the one or more actions in payload portion 206 are performed only when that particular identified media content is being played back.

In one or more embodiments, a delay parameter is included in criteria portion 202. The delay parameter identifies how long after the other criteria or parameters in criteria portion 202 are satisfied that the one or more actions in payload portion 206 are to be performed. Analogous to the time-shift parameter 204, this delay parameter can be an explicit value or a relative value (e.g., relative to a starting time of the media content, an ending time of the media content, and so forth). For example, trigger 200 may indicate that at a particular time, when a particular channel is tuned to, a particular application is to be run and time-shift parameter 204 can identify the playback of the corresponding media content can be time-shifted up to two hours. The particular time, particular channel, and time-shift parameter are identified in criteria portion 202, and the one or more actions to run the particular application are identified in payload portion 206. Additionally, a delay parameter can be included in criteria portion 202 to indicate that once the particular time and particular channel criteria are satisfied, running of the particular application is to be delayed one hour. Alternatively, the delay parameter, or an indication of the delay, can be included elsewhere. For example, the delay parameter or an indication of the delay can be included in payload portion 206, monitor module 104 of FIG. 1, otherwise accessible to monitor module 104, and so forth. Accordingly, even though the other criteria in criteria portion 202 are satisfied, the particular application would not be run until an hour later due to the delay parameter.

Returning to FIG. 1, monitor module 104 monitors data of media content 110 to identify when the criteria of one or more triggers 122 are satisfied. Monitor module 104 can communicate with playback module 102 to identify the particular media content 120 being output by module 102 at any given time. Alternatively, monitor module 104 can receive media content 110 (directly or via content store 108) and monitor this received content directly rather than via playback module 102. Monitor module 104 can monitor data of media content 110 as media content 110 is received from content store 108 or alternatively from another source.

In one or more embodiments, triggers 122 correspond to particular media content. This correspondence can be identified in a variety of different manners. For example, an identifier of the media content can be included in the criteria portion of the media content. By way of another example, triggers 122 can be collected or grouped together in trigger store 106 based on their corresponding media content. Alternatively, a trigger 122 can correspond to all media content, to multiple different media content, and so forth.

Monitor module 104 can monitor one or more of different types of content included in media content 110. For example, monitor module 104 can monitor one or more of audio content and video content. Additionally, in one or more embodiments media content 110 includes metadata content, and monitor module 104 can monitor this metadata content. The metadata can be included as part of (e.g., embedded in) other types of content (e.g., included in a vertical blanking interval (VBI) of video content, included in a packet header, and so forth). Alternatively, the metadata can be separate from other types of content, such as being included in a separate stream or channel from the audio, video, and/or other types of content. This metadata included in media content 110 is associated with, and describes, the audio, video, and/or other types of content in media content 110. Examples of such metadata include closed captioning data that is a text version of the audio content included in media content 110, teletext data corresponding to media content 110, song or program title information corresponding to media content 110, and so forth.

When the data of media content 110 satisfies the one or more criteria of a trigger 122, the one or more actions identified in that trigger 122 are performed. The data of media content 110 being monitored can include the media content 110 itself, such as metadata, video content, audio content, and so forth. The media content 110 itself can be monitored to identify particular text (e.g., particular letters, numbers, symbols, and so forth), particular images, particular audio data, and so forth. The particular manner in which media content 110 is monitored is based at least in part on the one or more triggers 122. For example, if a trigger 122 indicates that one criteria is particular text that is to occur in media content 110, then monitor module 104 monitors the media content for that particular text.

The data of media content 110 being monitored can also include different data describing the playback of media content 110. This different data can be obtained from different sources, such as included as part of media content 110 (e.g., header information describing media content 110), from media content playback module 102, from content store 108, and so forth. A variety of different data describing the playback of media content 110 can be monitored, such as a television channel that is tuned to for playback, the title of program being played back as the media content, and so forth.

During playback of media content, monitor module 104 maintains and/or accesses a current date and/or time. This current date and/or time can be, for example, a system or device time maintained by the consumer device playing back the media content. This current date and/or time can be used by monitor module 104 in determining whether one or more of the criteria of a trigger are satisfied. For example, the current date and/or time can be compared to the value of the time-shift parameter in the trigger to determine whether the trigger is valid at the current date and/or time.

It should be noted that in one or more embodiments the data of media content 110 is available for analysis by monitor module 104 an amount of time (e.g., at least a few seconds) before the media content 110 is played back by module 102. Accordingly, monitor module 104 can analyze the data of media content 110 prior to the media content being played back by module 102, allowing the one or more actions to be performed at approximately the same time, or alternatively an amount of time before, particular criteria are actually satisfied by the media content 110. For example, if the criteria were to run a particular application causing a user interface to be displayed at a particular time, then the media content 110 can be analyzed and the application run an amount of time before that particular time specified by the criteria so that the user interface can be displayed at that particular time specified by the criteria.

When monitor module 104 determines that the one or more criteria of a trigger 122 are satisfied, monitor module 104 performs the one or more actions in the payload portion of that trigger. In response to performing these one or more actions, monitor module 104 generates a trigger result 124 that is output by consumer device 100. Media content 120 and/or trigger result 124 are output by consumer device 100 as media output 126. In one or more embodiments, media content 120 and trigger result 124 are output concurrently as media output 126. In such embodiments, playback of media content 120 can continue while trigger result 124 is output, or alternatively playback of media content 120 can be paused while trigger result 124 is output. Alternatively, media content 120 and trigger result 124 can be output separately, with the output of one of content 120 and result 124 being excluded from media output 126 when the other is being output.

Trigger result 124 can be the output of a variety of different types of content, such as video content, image content, audio content, and so forth. Trigger result 124 can be displayed or otherwise presented concurrently with media content 120. For example, trigger result 124 can be video content or an image that is displayed overlaid on media content 120, such as a small icon at the bottom of a display. These small icons can also be referred to as "bugs". By way of another example, trigger result 124 can be audio content that is played back concurrently with media content 120. By way of yet another example, trigger result 124 can be displayed in a separate portion or window (e.g., in a picture-in-picture (PIP) window) from media content 120. Alternatively, as above, trigger result 124 can be displayed or otherwise presented separately from the display or other presentation of media content 120.

Additionally, it should be noted that in order to perform the one or more actions identified in the payload portion of a trigger, monitor module 104 may access one or more other devices. For example, monitor module 104 may access a remote device over a network to retrieve content to be displayed as trigger result 124. In one or more embodiments, monitor module 104 accesses a remote server over the Internet to retrieve one or more images or Web pages to be displayed as trigger result 124.

Alternatively, in one or more embodiments monitor module 104 invokes one or more other components or modules to generate the output of trigger result 124. For example, monitor module 104 can invoke a Web browser module, a remote device communication module (e.g., supporting RDP (Remote Desktop Protocol)), other applications that display or otherwise present information, and so forth. Such other components or modules can be invoked in a variety of different manners, such as firing an event that is dispatched to the appropriate component or module by an event dispatcher, invoking an application programming interface (API) exposed by the component or module, and so forth.

Monitor module 104 can be implemented to monitor the data of media content 110 and compare it to triggers 122 in a variety of different manners. In one or more embodiments, monitor module 104 (or alternatively another component or module) generates trigger objects and session objects. A trigger object is generated for each trigger 122 and includes the criteria and actions to be performed from the criteria and payload portions of the trigger 122. A session object is also generated that describes the current media content session. The session object includes data of the media content (e.g., channel number via which the media content is being received, call sign of the channel via which the media content is being received, title of the programming that is distributed as the media content, and so forth). Metadata of the media content (or other types of data being monitored by module 104) is typically not included in this session object but rather is analyzed as it is received. Alternatively, this metadata or other type of data can be included in the session object.

Triggers 122 can be provisioned triggers and/or application-based triggers. A provisioned trigger refers to a trigger that is distributed to consumer device 100 by some remote device or component. This distribution is initiated by the remote device or component, and the provision triggers typically remain in trigger store 106 until they expire or are updated by the remote device or component. An application-based trigger refers to a trigger that is added to trigger store 106 by an application or module running on consumer device 100. Application-based triggers typically remain in trigger store 106 while the application is running, and are removed from trigger store 106 when the application stops running.

In one or more embodiments, all of the criteria included in the criteria portion of the trigger need to be satisfied in order for the one or more actions in the payload portion to be performed. Alternatively various logical operators, such as "AND" and "OR", can be used in conjunction with the criteria to allow different combinations to be defined. For example, four different criteria could be listed, at least one of which is to be satisfied in order for the one or more actions to be performed. By way of another example, three different criteria could be listed, a particular one of which and either one (or both) of the other two is (are) to be satisfied in order for the one or more actions to be performed.

Additionally, it should be noted that criteria can be full-match or partial-match criteria. Full-match criteria indicates that the criteria is to match the data of the programming content exactly, whereas partial-match criteria indicates that the data of the programming is to include at least the partial-match criteria. For example, if the data of the programming were "Microsoft Corporation" and the criteria were "Corporation", then the criteria would be a partial-match to the data of the programming but not a full-match. Whether criteria is full-match or partial-match can be inherent in the particular criteria, or identified in other manners such as including a flag or other value with the criteria indicating whether it is full-match or partial-match.

Furthermore, partial-match criteria can be a "starts-with" partial-match, an "anywhere" partial-match, or other type of partial-match. A starts-with partial-match indicates that the data of the programming is to start with the criteria, whereas an anywhere partial-match indicates that the criteria can be included anywhere in the data of the programming. For example, if the data of the programming were "Microsoft Corporation" and the criteria were "Corporation", then the criteria would be an anywhere partial-match to the data of the programming but not a starts-with partial-match. Other types of partial matches can also be defined using regular expressions. For example, quantifiers or wild cards can be used, such as "*" to indicate zero or more characters, "?" to indicate zero or one characters, and so forth. Whether partial-match criteria is starts-with or anywhere criteria, or alternatively other criteria, can be inherent in the particular criteria or can be identified in other manners such as including a flag or other value with the criteria indicating whether it is starts-with or anywhere.

In one or more embodiments, trigger result 124 is output for a particular amount of time. The duration of the output of trigger result 124 can be the same for all triggers, or alternatively can vary by trigger. In one or more embodiments, each trigger 122 includes as part of its payload portion an identifier of the duration of the output of trigger result 124 for that particular trigger. This can be an explicit identifier (e.g., display a particular image for fifteen seconds), or an implicit identifier (e.g., run a particular program, and cease outputting the user interface of that particular program when the program stops running, when a particular user input has been received by the program, and so forth). Alternatively, the duration can be identified in different manners. For example, monitor module 104 can be programmed or otherwise configured with an indication of the duration, media content 110 can identify durations for trigger results occurring during playback of media content 110, and so forth.

Additionally, in one or more embodiments monitor module 104 performs the one or more actions identified in a trigger once. After the one or more actions have been performed once, monitor module 104 no longer performs the actions even though the criteria of the trigger may be satisfied. Alternatively, in other embodiments monitor module 104 can perform the actions one or more actions identified in a trigger each time the criteria are satisfied. In such embodiments, monitor module 104 can restrict how frequently the actions can be performed. For example, even though the criteria may be satisfied every 30 seconds, monitor module 104 can restrict the actions to being performed no more than once every hour, no more than once for a particular program, and so forth.

Such restrictions can be imposed by monitor module 104 in a variety of different manners. In one or more embodiments, a trigger 112 includes an indication of how frequently the one or more actions can be performed. This indication can be included, for example, in the payload portion of the trigger. When the criteria of a trigger are satisfied and the one or more actions performed, monitor module 104 obtains an indication of how frequently the one or more actions can be performed. This indication can indicate a time (e.g., 30 seconds, five minutes, once per day, etc.), in which case monitor module 104 does not perform the one or more actions until after that amount of time has elapsed. Monitor module 104 need not check whether the criteria of that trigger are satisfied until after that indicated frequency is passed. Alternatively, monitor module 104 may check whether the criteria of the trigger are satisfied, but not perform the one or more actions until after that indicated frequency is passed. Alternatively, this indication can be a count value (e.g., 5, 8, 12, 50, etc.), in which case monitor module 104 keeps track of how many times the one or more actions have been performed in response to the criteria being satisfied, and does not perform the one or more actions after the count value has been reached. This count value can optionally be reset at regular or irregular intervals (e.g., hourly, daily, each time a new program begins or a channel change occurs, and so forth).

It should be noted that conflict situations can arise where the criteria of multiple different triggers are satisfied concurrently. Such conflicts can be resolved in a variety of different manners. In one or more embodiments, each trigger includes a priority value and the conflict is resolved by performing the actions for the trigger with the higher priority value. In other embodiments, monitor module 104 can keep track of when the actions identified by the different triggers have been performed. In such embodiments, these conflicts can be resolved by performing the actions for the trigger that least recently had its actions performed. Alternatively, these conflicts can be resolved in other manners, such as random selection of a trigger, concurrently performing the actions identified by multiple triggers, selecting triggers according to some other criteria or rules, and so forth.

As discussed above, a variety of different criteria or parameters can be included in the criteria portion of a trigger. Table I lists example criteria that can be included in the criteria portion of a trigger in accordance with one or more embodiments. It is to be appreciated that Table I lists only example criteria; not all of the criteria in Table I need be used, or alternatively additional criteria can be included.

TABLE I

| Criteria | Description |
|---|---|
| Time-Shift | How much playback of the media content can be time-shifted. Can be an explicit or relative value. |
| Delay | How long after the other criteria or parameters are satisfied that the one or more actions in the payload portion are to be performed. Can be an explicit or relative value. |

TABLE I-continued

| Criteria | Description |
|---|---|
| Keyword | One or more keywords to occur in the media content. |
| Title | The title of a program that is included in the media content. |
| Episode | The episode of a program that is included in the media content. |
| Description | A description of a program that is included in the media content. |
| Actor List | One or more actors or actresses that appear in a program that is included in the media content. |
| Director | One or more directors of a program that is included in the media content. |
| Currently tuned channel call sign | A call sign of the channel via which the media content is being received. |
| Currently tuned channel number | A number of the channel via which the media content is being received. |
| DateTime Beginning | A beginning date and/or time for the trigger. This criteria is satisfied only if the current date and/or time is after the beginning date and/or time. |
| DateTime Ending | An ending date and/or time for the trigger. This criteria is satisfied only if the current date and/or time is before the ending date and/or time. |
| DateTime Expire | An expiration date and/or time for the trigger. This criteria is satisfied only if the current data and/or time is before the expiration date and/or time. The trigger can optionally be removed (e.g., by monitor module 104) after the expiration date and/or time. |
| Program-relative Beginning Time | A time value which is added to the program's beginning DateTime. If no time value is specified, then the program's beginning DateTime is used. This derived value is then used as the comparison criteria, comparing against the current DateTime value. This criteria is satisfied only if the current DateTime is greater than or equal to the derived value. |
| Program-relative Ending Time | A time value which is added to the program's beginning DateTime. If no time value is specified, then the program's ending DateTime is used. This derived value is then used as the comparison criteria, comparing against the current DateTime value. This criteria is satisfied only if the current DateTime is less than or equal to the derived value. |

These triggers thus allow different actions to be performed in a variety of different manners and further allow user interaction in a variety of different manners. For example, a trigger can be generated with a time-shift parameter indicating that playback of a program can be time-shifted two hours. If playback of the program occurs within two hours of the airing of the program, then the one or more actions in the payload portion of the trigger would be performed (assuming any other criteria of the trigger are satisfied); otherwise the one or more actions in the payload portion of the trigger would not be performed.

By way of another example, a trigger can be generated with a time-shift parameter indicating that playback of the program can be time-shifted two hours, a program-relative beginning time parameter indicating that playback of the program is to be within the first five minutes of the program, and a delay parameter indicating that the one or more actions in the payload portion are to be performed at the end of the program. Thus, in order for the criteria of this trigger to be satisfied, playback of the program cannot be time-shifted more than two hours, and at least a portion of the first five minutes of the program is to be played back. If these criteria are satisfied (assuming any other criteria of the trigger are also satisfied), then the one or more actions in the payload portion of the trigger would be performed at the end of the program; otherwise the one more actions in the payload portion of the trigger would not be performed.

In one or more embodiments, monitor module 104 resets triggers whenever a change in channel being played back is made. Resetting a trigger refers to treating the trigger as if none of the criteria of the trigger have been satisfied, so that the one or more criteria of the trigger would need to be re-satisfied in order for the one or more actions identified by the trigger to be performed. In such embodiments, this can result in the one or more actions in the payload portion of the trigger not being performed even though the criteria the trigger may have been satisfied. Following the previous example, if playback of the program was not time-shifted more than two hours and at least a portion of the first five minutes of the program was played back, then these criteria of the trigger have been satisfied but the delay parameter indicates that the one or more actions in the payload portion of the trigger are not to be performed until the end of the program. If the user tunes to a different channel after ten minutes, this trigger is reset, so even if the user were to return to this channel the one or more actions in the payload portion of the trigger would not be performed.

Some example triggers are discussed in the following. It is to be appreciated that these are only examples, and that other formats and triggers can be used with the triggers for time-shifted content playback discussed herein. One example trigger is:

[TITLE:xyz], [TIME-SHIFT:2:00:00], [EVENT:act1]

This example trigger indicates that the criteria are a program title (TITLE) is to be "xyz" and playback of the program can be time-shifted (TIME-SHIFT) up to two hours after the program was aired (e.g., playback of the program can be time-shifted to begin up to two hours after the program was aired). If that criteria are satisfied then an action (EVENT) of "act1" is to be performed. This action "act1" can be any of a variety of different actions as discussed above. Another example trigger is:

[TITLE:xyz],[TIME-SHIFT:2008-04-15T21:00:00], [BEG:00:05:00], [DELAY:00:59:30],[EVENT:someURL]

This example trigger indicates that the criteria are: a program title (TITLE) is to be "xyz", playback of the program can be time-shifted (TIME-SHIFT) until Apr. 15, 2008 at 11:00 pm, and a program-relative beginning time parameter (BEG) indicates that at least part (5 minutes) of the beginning of the program is to be played back. A delay parameter (DELAY) indicates that if the other criteria (TITLE, TIME-SHIFT, and BEG) are satisfied, then one or more actions identified at "someURL" (e.g., running a program, displaying a Web page, etc.) are to be performed at the end of the program identified as 59 minutes and 30 seconds after the beginning of the program.

Figure 3:
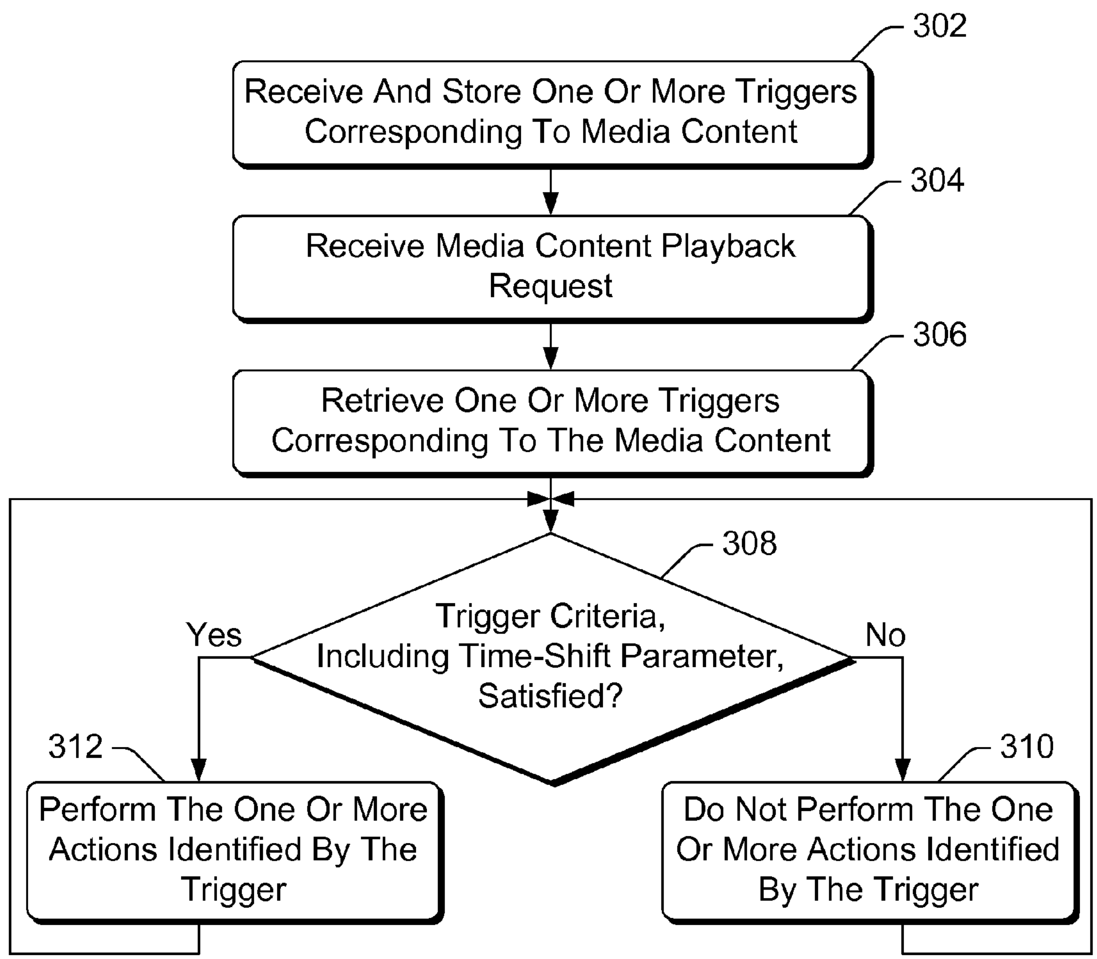
FIG. 3 is a flowchart illustrating an example process for implementing triggers for time-shifted content playback in accordance with one or more embodiments.

FIG. 3 is a flowchart illustrating an example process 300 for implementing triggers for time-shifted content playback in accordance with one or more embodiments. Process 300 is carried out by a device, such as consumer device 100 of FIG. 1, and can be implemented in software, firmware, hardware, or combinations thereof. Process 300 is an example process for implementing triggers for time-shifted content playback; additional discussions of triggers for time-shifted content playback are included herein with reference to different figures.

In process 300, one or more triggers corresponding to media content are received and stored (act 302). As discussed above, the triggers can be received in a variety of different manners via a variety of different transmission media or using other distribution techniques. The corresponding media content can also optionally be received and stored in act 302, or alternatively the media content need not be stored. Additionally, the media content and corresponding triggers can be received together or separately as discussed above.

A request to playback the media content is also received (act 304). This request can be received from a user or alternatively another component, module, or device. The request can be for previously aired media content (e.g., media content that has been received and stored), or alternatively for other media content (e.g., for media content currently being aired).

In response to the request in act 304, one or more triggers corresponding to the media content are retrieved (act 306). These one or more triggers are the triggers received in act 302.

For each of the one or more triggers, a check or determination is made as to whether the criteria of the trigger, including a time-shift parameter, is (or are) satisfied (act 308). If the criteria is (or are) not satisfied, then the one or more actions identified by the trigger are not performed (act 310). However, if the criteria is (or are) satisfied, then the one or more actions identified by the trigger are performed (act 312). Regardless of whether the one or more actions are performed, process 300 continues checking the criteria in act 308 while the media content is being playback.

It should be noted that different triggers can have different criteria but identify the same one or more actions. Accordingly, even though the one or more actions are not performed in act 310 because the criteria for one of the triggers is not satisfied, this does not prevent those same one or more actions from being performed in act 312 when the criteria of that trigger is later satisfied or the criteria of another trigger identifying the same one or more actions are satisfied.

Figure 4:
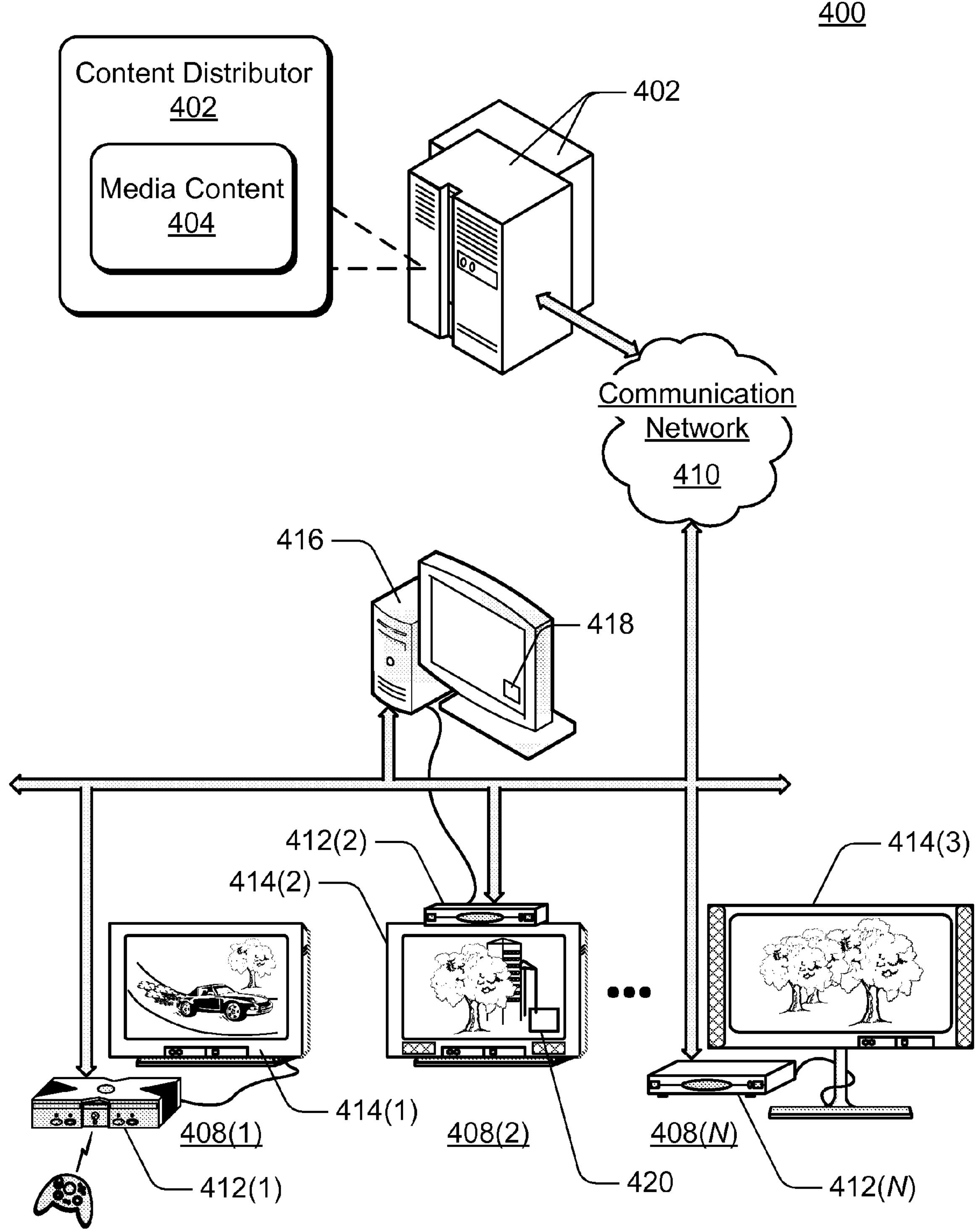
FIG. 4 illustrates an example system in which one or more embodiments of triggers for time-shifted content playback can be implemented.

FIG. 4 illustrates an example system 400 in which one or more embodiments of triggers for time-shifted content playback can be implemented. System 400 includes one or more content distributors 402 that communicate media content 404 to any number "N" of various television client systems 408 (1-N) via a communication network 410. Client systems 408 can each be, for example, a different type (or alternatively the same types) of consumer device 100 of FIG. 1. Communication network 410 can be implemented to include an IP-based network that facilitates media content distribution and data communication between the content distributor(s) 402 and any number of television client devices.

Each of client systems 408(1-N) includes a respective television client device 412(1-N) and a respective display device 414(1-N), such as any type of television, monitor, LCD, projector, or similar television-based display system that renders audio, video, and/or image data. Any of client devices 412(1-N) can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device. Any of television client devices 412(1-N) may also be associated with a user (e.g., a person) and/or an entity that operates a client device such that a television client device describes logical clients that include users, software, and/or devices.

Any of television client devices 412(1-N) of the respective client systems 408(1-N) can be implemented with one or more processors, a communication module, memory components, a media content rendering system, and a monitor module and trigger store to implement embodiments of triggers for time-shifted content playback. Additionally, each of television client devices 412(1-N) can be configured for communication with any number of different content distributors 402 to receive any type of media content 404 via the communication network 410. Further, any of the television client devices 412(1-N) can be implemented with any number and combination of differing components as further described with reference to the example client device shown in FIG. 5.

In this example, client device 412(2) is a television set-top box that is connected, or otherwise communicatively linked, to a computing device 416 that can be implemented to display trigger results 418. Although example trigger results 418 are illustrated in FIG. 4, it is to be appreciated that trigger results 418 can be presented in other manners as discussed above. Computing device 416 can also be configured for communication with a content distributor 402 to receive the trigger (e.g., triggers 122 of FIG. 1) via the communication network 410.

Figure 5:
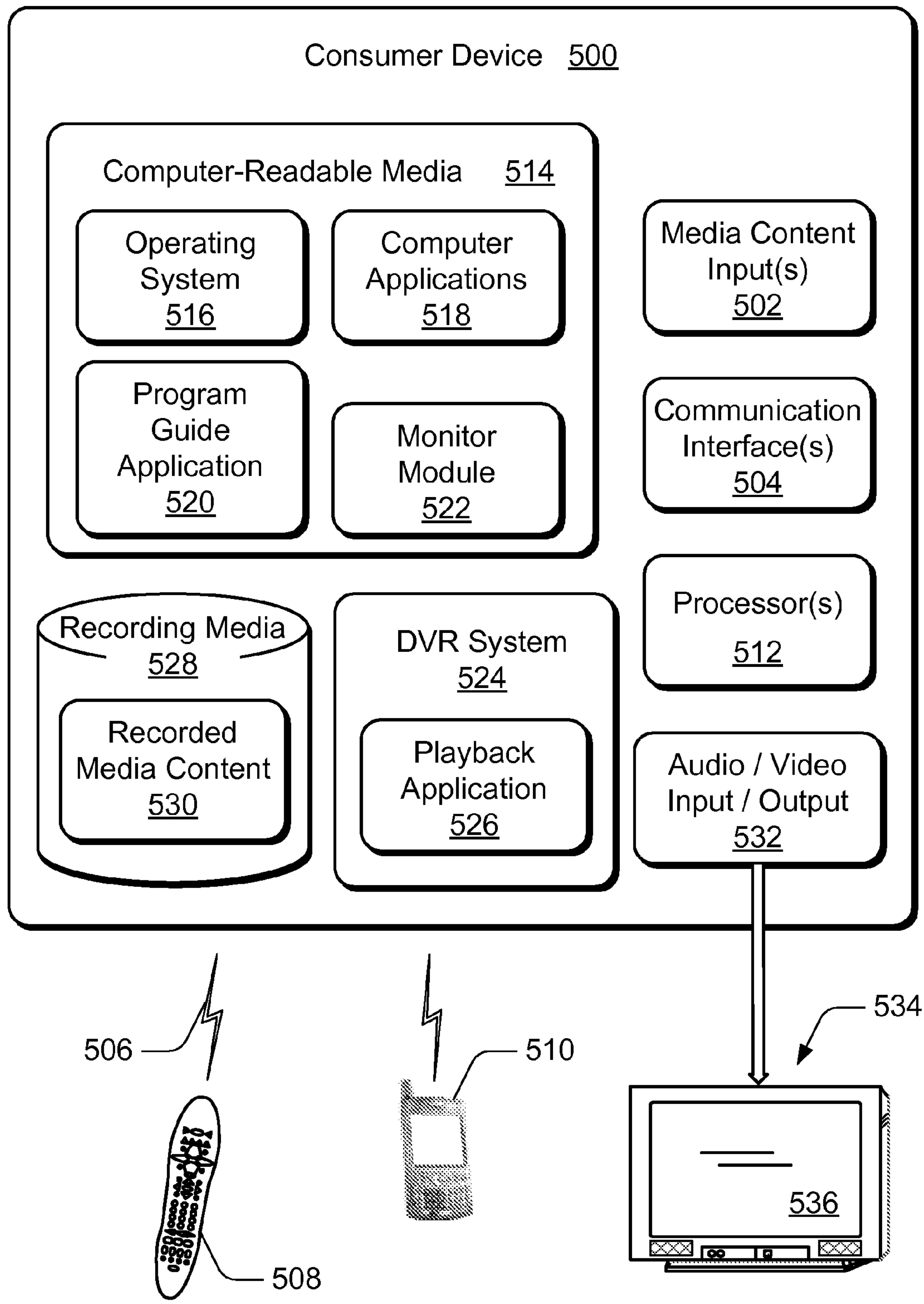
FIG. 5 illustrates various components of an example consumer device that can implement one or more embodiments of triggers for time-shifted content playback.

FIG. 5 illustrates various components of an example consumer device 500 that can be implemented as any form of a computing, electronic, or television client device to implement one or more embodiments of triggers for time-shifted content playback. For example, consumer device 500 can be implemented as consumer device 100 shown in FIG. 1, and/or as any of the client devices 412(1-N) of client systems 408 (1-N) shown in FIG. 4. In various embodiments, consumer device 500 can be implemented as any one or combination of a television client device, a gaming system, or as any other computing-based device, such as a desktop computer, a portable computer, a television set-top box, a digital video recorder (DVR), an appliance device, a gaming console, and/or as any other type of computing-based client device.

Consumer device 500 includes one or more media content inputs 502 that may include Internet Protocol (IP) inputs over which streams of media content are received via an IP-based network. Consumer device 500 further includes communication interface(s) 504 that can be implemented as any one or more of a serial and/or parallel interface, a wireless interface, any type of network interface, a modem, and as any other type of communication interface. A wireless interface enables client device 500 to receive control input commands 506 and other information from an input device, such as from remote control device 508, a portable computing-based device (such as a cellular phone) 510, or from another infrared (IR), 802.11, Bluetooth, or similar RF input device.

A network interface provides a connection between consumer device 500 and a communication network by which other electronic and computing devices can communicate data with device 500. Similarly, a serial and/or parallel interface provides for data communication directly between client device 500 and the other electronic or computing devices. A modem facilitates client device 500 communication with other electronic and computing devices via a conventional telephone line, a DSL connection, cable, and/or other type of connection.

Consumer device 500 also includes one or more processors 512 (e.g., any of microprocessors, controllers, and the like) which process various computer-executable instructions to control the operation of device 500, to communicate with other electronic and computing devices, and to implement embodiments of triggers for time-shifted content playback. Consumer device 500 can be implemented with computer-readable media 514, such as one or more memory components, examples of which include random access memory (RAM), nonvolatile memory (e.g., any one or more of a read-only memory (ROM), flash memory, EPROM, EEPROM, etc.), and a disk storage device. A disk storage device can include any type of magnetic or optical storage device, such as a hard disk drive, a recordable and/or rewriteable compact disc (CD), a DVD, a DVD+RW, and the like.

Computer-readable media 514 provides data storage mechanisms to store various information and/or data such as software applications and any other types of information and data related to operational aspects of consumer device 500. For example, an operating system 516 and/or other computer applications 518 can be maintained as software applications with the computer-readable media 514 and executed on processor(s) 512 to implement embodiments of the triggers for time-shifted content playback.

Consumer device 500 can also include a program guide application 520 that is implemented to process program guide data and generate program guides for display. A program guide enables a viewer to navigate through an onscreen display and locate various media content such as broadcast programs, recorded programs, video on-demand programs and movies, interactive game selections, network-based applications, and other media content of interest to the viewer. Consumer device 500 can also include a monitor module 522 (shown as a software module in this example) to implement various embodiments of triggers for time-shifted content playback as described herein.

Consumer device 500 can also include a DVR system 524 with playback application 526, and recording media 528 to maintain recorded media content 530 that consumer device 500 receives and/or records. Further, consumer device 500 may access or receive additional recorded media content that is maintained with a remote data store (not shown). Consumer device 500 may also receive media content from a video on-demand server, or media content that is maintained at a broadcast center or content distributor that distributes the media content to subscriber sites and client devices. Playback application 526 is a video control application that can be implemented to control the playback of media content, the recorded media content 530, and/or other video on-demand media content, music, and any other audio, video, and/or image media content which can be rendered and/or displayed for viewing. Playback application 526 can be, for example, media content playback module 102 of FIG. 1.

Consumer device 500 also includes an audio and/or video output 532 that provides audio and/or video data to an audio rendering and/or display system 534. Audio rendering and/or display system 534 can include any devices that process, display, and/or otherwise render audio, video, and image data. Video signals and audio signals can be communicated from consumer device 500 to a display device 536 via an RF (radio frequency) link, S-video link, composite video link, component video link, DVI (digital video interface), analog audio connection, or other similar communication link. Alternatively, audio rendering and/or display system 534 can be implemented as integrated components of the example consumer device 500. Consumer device 500 along with the audio rendering and/or display system 534 is an example of a viewing system that can be implemented in a household viewing area for viewing television programs and/or receiving other television media content.

Figure 6:
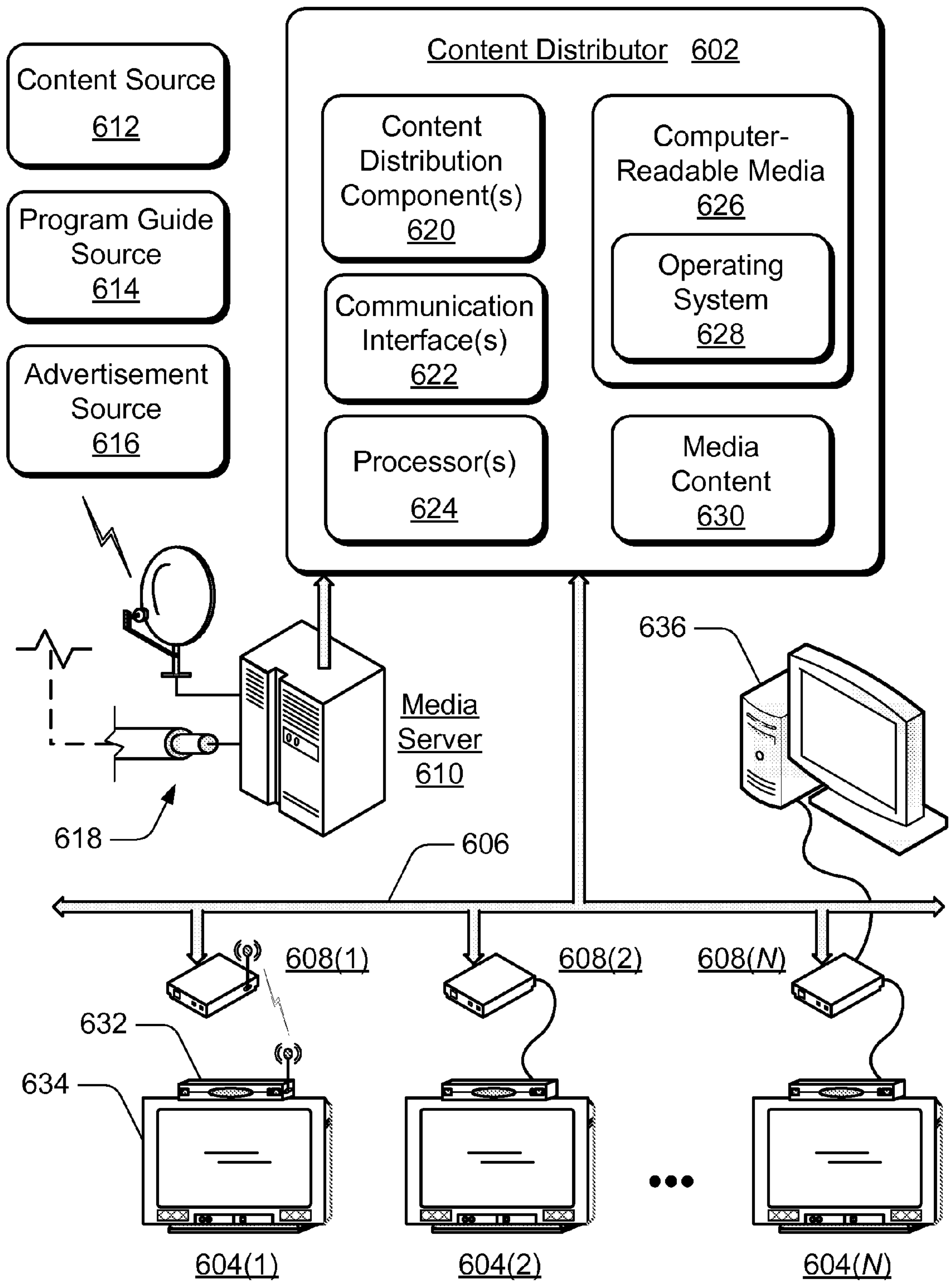
FIG. 6 illustrates an example entertainment and information system in which one or more embodiments of triggers for time-shifted content playback can be implemented.

FIG. 6 illustrates an example entertainment and information system 600 in which one or more embodiments of triggers for time-shifted content playback can be implemented. System 600 facilitates the distribution of media content, program guide data, and advertising content to multiple viewers and to multiple viewing systems. System 600 includes a content distributor 602 and any number "N" of client systems 604(1-N) each configured for communication via a communication network 606. Each client system 604(1-N) is an example of the client systems 408(1-N) described with reference to FIG. 5. Each of the client systems 604(1-N) can receive data streams of media content, media content, program guide data, advertising content, closed captioning data, and the like from content server(s) of content distributor 602 via communication network 606.

Communication network 606 can be implemented as any one or combination of a wide area network (e.g., the Internet), a local area network (LAN), an intranet, an IP-based network, a broadcast network, a wireless network, a Digital Subscriber Line (DSL) network infrastructure, a point-to-point coupling infrastructure, or as any other media content distribution network. Additionally, communication network 606 can be implemented using any type of network topology and any network communication protocol, and can be represented or otherwise implemented as a combination of two or more networks. A digital network can include various hardwired and/or wireless links 608(1-N), routers, gateways, and so on to facilitate communication between content distributor 602 and client systems 604(1-N).

System 600 includes a media server 610 that receives media content from a content source 612, program guide data from a program guide source 614, and advertising content from an advertisement source 616. This advertising content can be advertising content associated with triggers as discussed above (e.g., advertising content displayed when the criteria of a trigger is satisfied), and/or different advertising content presented to users of system 600. In one or more embodiments, media server 610 represents an acquisition server that receives the audio and video media content from content source 612, an EPG server that receives the program guide data from program guide source 614, and/or an advertising management server that receives the advertising content from the advertisement source 616.

Content source 612, program guide source 614, and advertisement source 616 control distribution of the media content, the program guide data, and at least some of the advertising content to the media server 610 and/or to other servers. The media content, program guide data, and advertising content can be distributed via various transmission media 618, such as satellite transmission, radio frequency transmission, cable transmission, and/or via any number of other wired or wireless transmission media. In this example, media server 610 is shown as an independent component of system 600 that communicates the media content, program guide data, and advertising content to content distributor 602. In an alternate implementation, media server 610 can be implemented as a component of content distributor 602.

Content distributor 602 is representative of a headend service in a content distribution system, for example, that provides the media content, program guide data, and advertising content to multiple subscribers (e.g., the client systems 604 (1-N)). Content distributor 602 can be implemented as a satellite operator, a network television operator, a cable operator, and the like to control distribution of media content, program and advertising content, such as movies, television programs, commercials, music, and other audio, video, and/or image content to client systems 604(1-N).

Content distributor 602 includes various content distribution components 620 to facilitate media content processing and distribution, such as a subscriber manager, a device monitor, and one or more content servers. The subscriber manager manages subscriber data, and the device monitor monitors client systems 604(1-N) (e.g., and the subscribers), and maintains monitored client state information.

Although the various managers, servers, and monitors of content distributor 602 (to include media server 610 in one or more embodiments) are described as distributed, independent components of content distributor 602, any one or more of the managers, servers, and monitors can be implemented together as a multi-functional component of content distributor 602. Additionally, any one or more of the managers, servers, and monitors described with reference to system 600 can implement features and embodiments of triggers for time-shifted content playback.

Content distributor 602 includes communication interface (s) 622 that can be implemented as any type of interface to communicate and receive data from client devices of the television system. Content distributor 602 also includes one or more processors 624 (e.g., any of microprocessors, controllers, and the like) which process various computer-executable instructions to control the operation of content distributor 602. Content distributor 602 can be implemented with computer-readable media 626 which provides data storage to maintain software applications such as an operating system 628 and media content 630 for distribution to the client systems 604(1-N).

Client systems 604(1-N) can each be implemented to include a client device 632 and a display device 634 (e.g., a television, LCD, and the like). A client device 632 of a respective client system 604 can be implemented in any number of embodiments, such as a set-top box, a digital video recorder (DVR) and playback system, an appliance device, a gaming system, and as any other type of client device that may be implemented in an entertainment and information system. In an alternate embodiment, client system 604(N) is implemented with a computing device 636 as well as a client device. The computing device 636 is an example of a connected data store that can record and maintain media content for a client device. Additionally, any client device 632 of a respective client system 604 can implement features and embodiments of triggers for time-shifted content playback as described herein.

Generally, any of the functions or techniques described herein can be implemented using software, firmware, hardware (e.g., fixed logic circuitry), manual processing, or a combination of these implementations. The terms "module" and "component" as used herein generally represent software, firmware, hardware, or combinations thereof. In the case of a software implementation, the module or component represents program code that performs specified tasks when executed on a processor (e.g., CPU or CPUs). The program code can be stored in one or more computer-readable memory devices. The features of the triggers for time-shifted content playback techniques described herein are platform-independent, meaning that the techniques can be implemented on a variety of commercial computing platforms having a variety of processors.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. One or more computer-readable media having stored thereon multiple instructions that, when executed by one or more processors of a consumer device, cause the one or more processors to:

store a trigger corresponding to media content on a storage device;

retrieve the trigger from the storage device;

check, while playing back the media content, whether one or more criteria of the trigger are satisfied, the one or more criteria including a time-shift parameter identifying an amount of time that the trigger is valid after a first available time that the media content is available for playback; and perform one or more actions identified by the trigger if the criteria of the trigger are satisfied, and not perform the one or more actions if the criteria of the trigger are not satisfied.

2. One or more computer-readable media as recited in claim 1, wherein the time-shift parameter identifies an ending date and time, and the time-shift parameter is satisfied only if a current time is earlier than the ending date and time.

3. One or more computer-readable media as recited in claim 1, wherein the media content is available for playback to the consumer device when the media content is communicated to the consumer device via an IP-based network.

4. One or more computer-readable media as recited in claim 1, the one or more criteria further including a program-relative beginning time parameter identifying at least a beginning portion of the media content that is to be played back, and further including a delay parameter identifying how long after the program-relative beginning time parameter and the time-shift parameter are satisfied that the one or more actions are to be performed.

5. One or more computer-readable media as recited in claim 1, wherein to retrieve the trigger from the storage device is to retrieve the trigger from the storage device in response to a request to playback the media content.

6. A method implemented in a consumer device, the method comprising:

retrieving a trigger corresponding to media content from a storage device, the trigger including a time-shift parameter identifying an amount of time that the trigger is valid after a first available time that the media content is available for playback; and determining, based at least in part on a current time and the time-shift parameter, whether the trigger is valid during playback of the media content.

7. A method as recited in claim 6, further comprising performing one or more actions identified in the trigger in response to determining that the trigger is valid during playback of the media content.

8. A method as recited in claim 6, wherein the time-shift parameter identifies an ending date and time, and the trigger is valid only if the current time is earlier than the ending date and time.

9. A method as recited in claim 6, wherein the media content is received by the consumer device via an IP-based network.

10. A method as recited in claim 6, the trigger further including a program-relative beginning time parameter identifying at least a beginning portion of the media content that is to be played back, and further including a delay parameter identifying how long after the program-relative beginning time parameter and the time-shift parameter are satisfied that the one or more actions are to be performed.

11. A method as recited in claim 6, wherein retrieving the trigger from the storage device comprises retrieving the trigger from the storage device in response to a request to playback the media content.

12. A consumer device comprising:

a trigger store to store multiple triggers, each of the multiple triggers comprising a criteria portion and a payload portion, the criteria portion identifying one or more criteria and the payload portion identifying one or more actions to be performed, the one or more criteria including a time-shift parameter identifying an amount of time that the trigger is valid after a first available time that media content is available for playback; and a monitor module, coupled to the trigger store, to monitor data corresponding to media content being played back and detect when the data satisfies the one or more criteria of one or more of the multiple triggers.

13. A consumer device as recited in claim 12, wherein the monitor module is further to invoke, in response to detecting that the data of the media content satisfies the one or more criteria of one of the multiple triggers, one or more additional modules to perform the one or more actions identified in the payload portion of the one trigger.

14. A consumer device as recited in claim 12, wherein the monitor module is further to perform, in response to detecting that the data of the media content satisfies the one or more criteria of one of the multiple triggers, the one or more actions identified in the payload portion of the one trigger.

15. A consumer device as recited in claim 12, wherein the time-shift parameter identifies an ending date and time for the trigger, and the data satisfies the time-shift parameter only if a current time is earlier than the ending date and time.

16. A consumer device as recited in claim 12, wherein the consumer device receives the media content via an IP-based network.

17. A consumer device as recited in claim 12, the one or more criteria of one of the multiple triggers further including a program-relative beginning time parameter identifying at least a beginning portion of the media content that is to be played back, and further including a delay parameter identifying how long after the data satisfies both the program-relative beginning time parameter and the time-shift parameter that the one or more actions in the payload portion of the one trigger are to be performed.

* * * * *